United States Patent
Sato

[11] Patent Number: 5,991,120
[45] Date of Patent: *Nov. 23, 1999

[54] CONTACT TYPE MAGNETIC DISK APPARATUS

[75] Inventor: Akinobu Sato, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/872,621

[22] Filed: Jun. 10, 1997

[30] Foreign Application Priority Data

Jun. 18, 1996 [JP] Japan .................................. 8-156692

[51] Int. Cl.⁶ ........................................................ G11B 5/48
[52] U.S. Cl. ................................................................ 360/104
[58] Field of Search ..................................... 360/103–106

[56] References Cited

U.S. PATENT DOCUMENTS

| | | | |
|---|---|---|---|
| 4,757,402 | 7/1988 | Mo | 360/103 |
| 5,034,828 | 7/1991 | Ananth et al. | 360/103 |
| 5,499,149 | 3/1996 | Dovek | 360/103 |
| 5,515,219 | 5/1996 | Ihrke et al. | 360/103 |
| 5,526,204 | 6/1996 | French et al. | 360/103 |
| 5,550,693 | 8/1996 | Hendricks et al. | 360/103 |
| 5,624,581 | 4/1997 | Ihrke et al. | 360/103 |
| 5,673,161 | 9/1997 | Yanagisawa et al. | 360/104 |
| 5,742,518 | 4/1998 | Gui et al. | 360/105 |

FOREIGN PATENT DOCUMENTS

| | | |
|---|---|---|
| 5-54578 | 3/1993 | Japan . |
| 5-89626 | 4/1993 | Japan ................................... 360/103 |
| 5105652 | 4/1993 | Japan . |
| 5325161 | 12/1993 | Japan . |
| 644718 | 2/1994 | Japan . |
| 6223533 | 8/1994 | Japan . |
| 6259739 | 9/1994 | Japan . |
| 7105652 | 4/1995 | Japan . |
| 869674 | 3/1996 | Japan . |
| WO 93/14495 | 7/1993 | WIPO . |

OTHER PUBLICATIONS

"Contact Recording on Perpendicular Rigid Media", Journal of Magnetic Society of Japan, vol. 15, Supplement, No. S2 (1991), pp. 483–490; Harold Hamilton.

*Primary Examiner*—Allen T. Cao
*Attorney, Agent, or Firm*—Hayes, Soloway, Hennessey, Grossman & Hage, P.C.

[57] ABSTRACT

A contact type magnetic disk apparatus includes a magnetic disk, a magnetic head slider, a plurality of contact pads, and a bounce prevention structure. The magnetic disk medium has a liquid lubricant applied to a predetermined film thickness on its surface. The magnetic head slider has a magnetic head which records/reproduces information in/from the magnetic disk medium, while sliding in contact with the magnetic disk medium. The contact pads are arranged on the magnetic head slider so as to face the magnetic disk medium, and come into contact with the surface of the magnetic disk medium. The bounce prevention structure is arranged on the head slider including the contact pads to prevent the bounce of the magnetic head slider from the magnetic disk medium by using the meniscus force of the liquid lubricant. The bounce prevention structure has a predetermined spacing with respect to the surface of the magnetic disk medium when the contact pads come into contact with the magnetic disk medium.

19 Claims, 12 Drawing Sheets

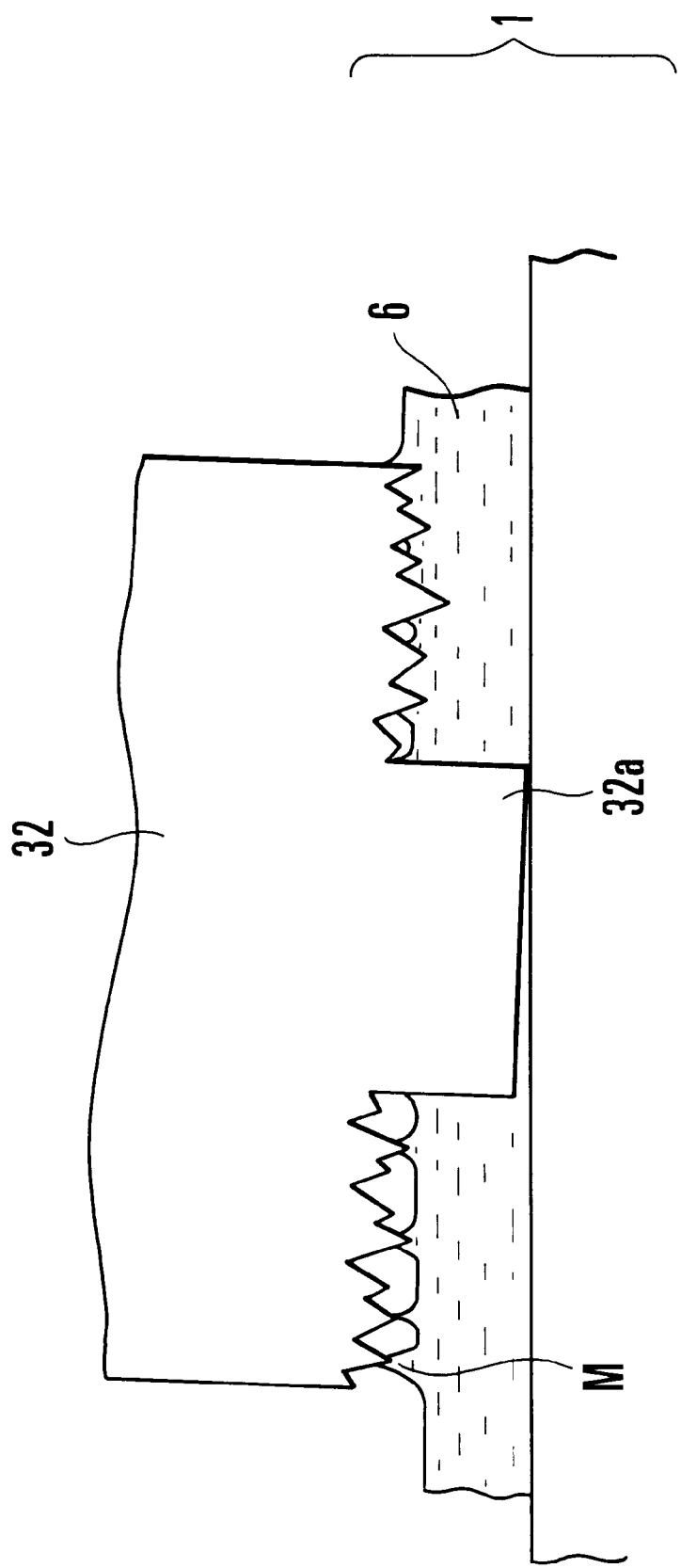

CONTACT TYPE MAGNETIC DISK APPARATUS

BACKGROUND OF THE INVENTION

The present invention relates to a magnetic disk apparatus and, more particularly, to a contact type magnetic disk apparatus which performs recording/reproduction in sliding contact with a magnetic disk medium.

Recently, in the field of information storage files, recording density has steadily been increased. One of important factors for achieving high-density recording in a magnetic disk apparatus is to decrease the spacing between a magnetic head and a magnetic disk medium holding writing and reading information.

To decrease the spacing between the magnetic head and the magnetic disk medium, a so-called contact type magnetic disk apparatus in which the magnetic head performs recording/reproduction in sliding contact with the surface of a magnetic disk medium is proposed in H. Hamilton, "CONTACT RECORDING ON PERPENDICULAR RIGID MEDIA", Journal of Magnetic Society of Japan, Vol. 15, Supplement, No. S2 (1991), pp. 483–490, and WO 93/14495.

In such a contact type magnetic disk apparatus such as disclosed in Japanese Patent Laid-Open No. 5-54578, the magnetic head slider is slid in contact with the magnetic disk medium having a liquid lubricant layer formed on its surface. By balancing the attraction arising from the surface tension of the liquid lubricant and the repulsion due to the pressure of the liquid lubricant, the magnetic head slider is caused to slightly float and is held in a noncontact state with respect to the magnetic disk medium, eliminating any damage or destruction resulting from the contact sliding.

In the conventional magnetic disk apparatus described above, however, the loading force of the magnetic head slider needs to be set small in order to prevent damage of the magnetic head slider and the magnetic disk medium. If small projections exist on the magnetic disk medium, or worn powder is deposited on the magnetic disk medium, the noncontact state of the magnetic head slider on the surface of the magnetic disk medium becomes unstable. The magnetic head slider cannot smoothly follow the recording surface of the magnetic disk medium.

More specifically, the magnetic head slider bounces on the magnetic disk medium. In this situation, high-density recording is interrupted, and the output value of a reproduction signal undesirably varies.

SUMMARY OF THE INVENTION

It is an object of the present invention to provide a contact type magnetic disk apparatus in which bounce of a magnetic head slider is suppressed to prevent damage and wear of the magnetic head slider and a magnetic disk medium, thereby enhancing the durability of the whole apparatus.

In order to achieve the above object, according to the present invention, there is provided a contact type magnetic disk apparatus comprising a magnetic disk medium having a liquid lubricant applied to a predetermined film thickness on a surface, a magnetic head slider having a magnetic head which records/reproduces information in/from the magnetic disk medium, while sliding in contact with the magnetic disk medium, a plurality of contact pads which are arranged on the magnetic head slider so as to face the magnetic disk medium, and come into contact with a surface of the magnetic disk medium, and a bounce prevention structure arranged on the head slider including the contact pads to prevent bounce of the magnetic head slider from the magnetic disk medium by using the meniscus force of the liquid lubricant, the bounce prevention structure having a predetermined spacing with respect to the surface of the magnetic disk medium when the contact pads come into contact with the magnetic disk medium.

BRIEF DESCRIPTION OF THE DRAWINGS

FIG. 7 illustrates the operation of the slider floating/engaging mechanism (bounce prevention structure) shown in FIG. 5;

DESCRIPTION OF THE PREFERRED EMBODIMENT

The present invention will be described in detail below with reference to the accompanying drawings.

Figure 1:
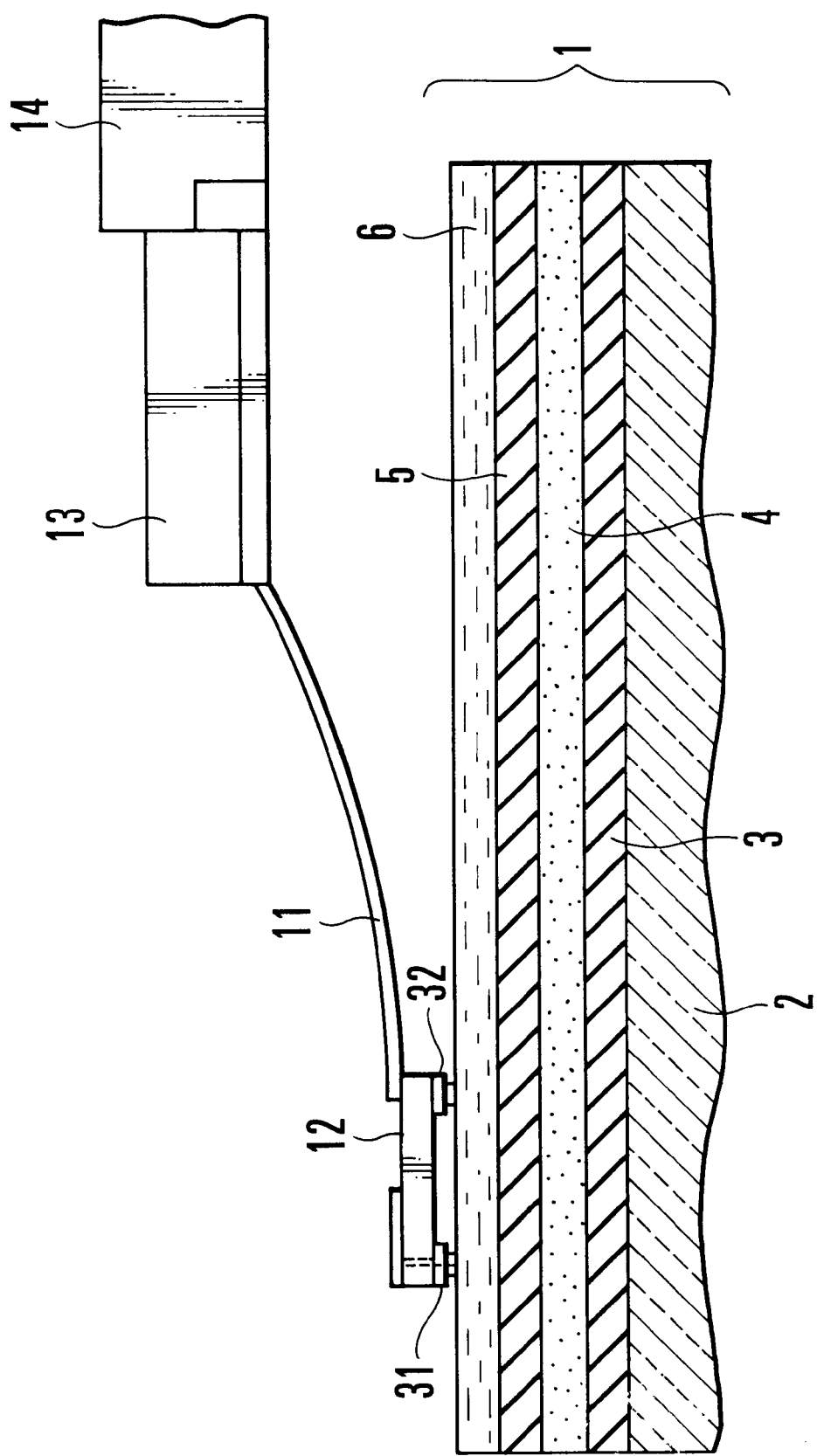
FIG. 1 is a view showing the schematic arrangement of a magnetic disk apparatus according to an embodiment of the present invention.

FIG. 1 shows the schematic arrangement of a contact type magnetic disk apparatus having a magnetic disk medium and a magnetic head slider according to an embodiment of the present invention, in which the magnetic disk medium is illustrated sectionally.

(Structure of Magnetic Disk Medium)

The basic structure of a magnetic disk medium 1 will be described below. In FIG. 1, a substrate 2 supports a magnetic layer serving as a magnetic recording carrier, and is constituted by a glass disk having a diameter of 90 mm and a thickness of 0.3 mm. An underlayer 3, a magnetic layer 4, and a protective film 5 are sequentially stacked on the upper surface of the substrate 2. A film of a liquid lubricant 6 is applied on the protective film 5 to constitute the magnetic disk medium 1.

The underlayer 3 serves as the path for magnetic flux generated from the magnetic layer 4 stacked on the upper surface of the underlayer 3, and is formed by sputtering chromium (Cr) to a thickness of 100 nm. The magnetic layer 4 is where magnetic recording information is stored, and is formed by sputtering CoCrPt to a thickness of 30 nm. The protective film 5 is used to suppress wear and damage of the magnetic layer 4, which are caused by sliding of the magnetic head slider, and to protect the magnetic layer 4 itself from corrosion and deterioration. The protective film 5 is formed by sputtering diamond-like carbon to a thickness of 5 nm.

The liquid lubricant 6 is used to reduce wear and resistance from sliding the magnetic head in contact with the magnetic disk medium 1. As the liquid lubricant 6, perfluoropolyether is applied by dipping to a film thickness of 5 nm. When the film thickness of the liquid lubricant 6 is to be changed, it is controlled by changing the concentration of the dipping solution.

(Magnetic Head Slider)

The magnetic head slider will be described below.

In FIG. 1, reference numeral 11 denotes a suspension spring having a magnetic head slider 12 mounted at its distal end. As the suspension spring 11, a stainless steel piece having a length of 10 mm, a width of 0.5 mm, and a thickness of 0.03 mm is used. The proximal end portion of the suspension spring 11 is held by a seek mechanism 14 through a spring support mechanism 13. The spring support mechanism 13 is constituted by a stainless steel plate member having length of 15 mm, a width of 3 mm, and a thickness of 1 mm. The seek mechanism 14 comprises a voice coil motor as a main member.

Figure 2:
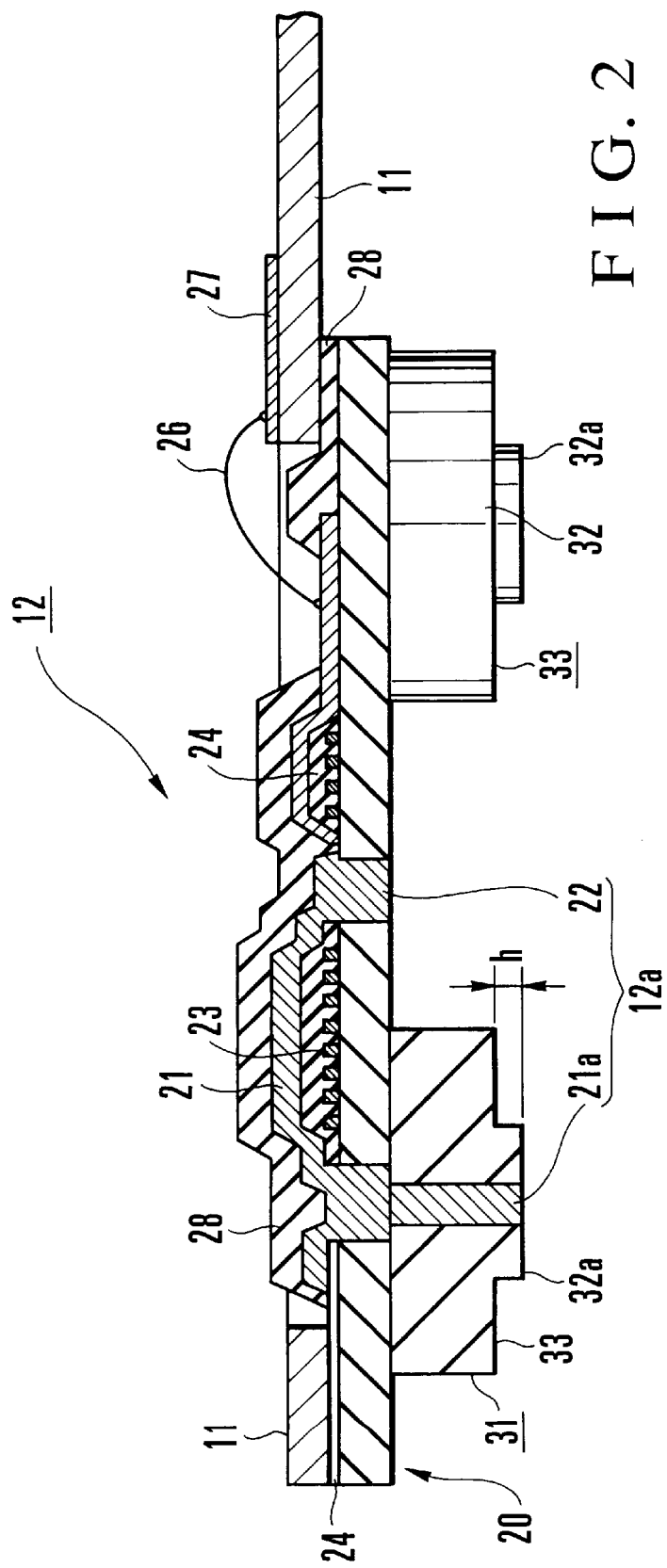
FIG. 2 is a schematic enlarged sectional view showing a magnetic head slider shown in FIG. 1.
Figure 3:
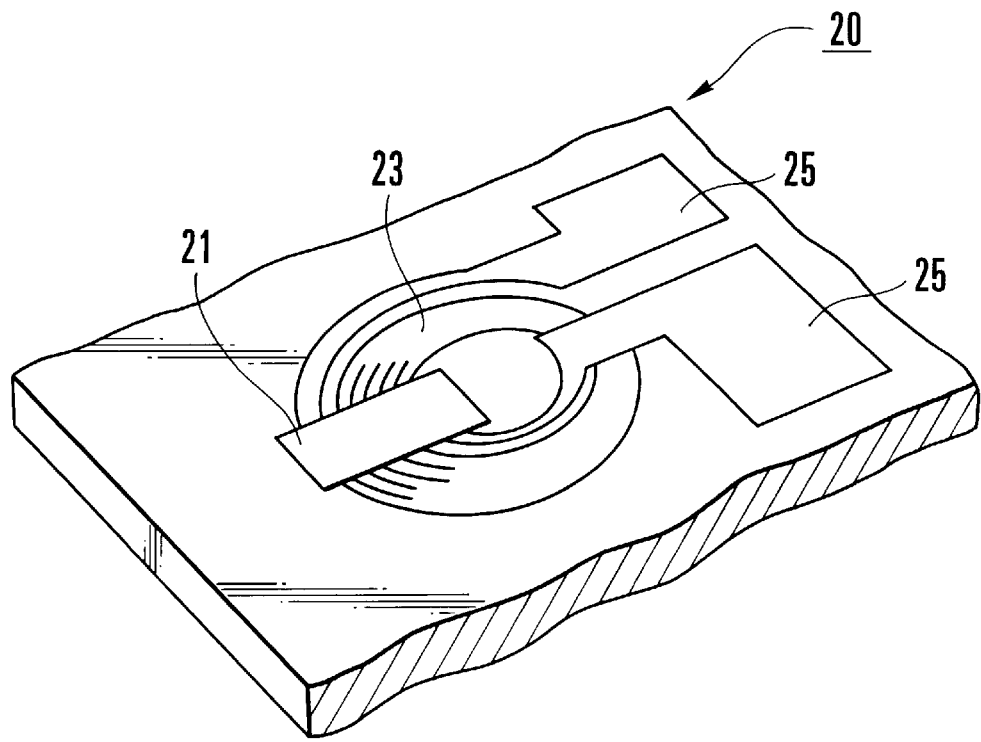
FIG. 3 is a schematic perspective view of main part showing the relationship between a slider main body and a coil shown in FIG. 2.

The magnetic head slider 12 has a slider main body 20 made of diamond, as shown in FIGS. 2 and 3. The slider main body 20 has a width of 1 mm, a length of 1.2 mm, and a thickness of 0.3 mm. In FIG. 2, the slider main body 20 comprises a magnetic head 12a which is constituted by a yoke 21 having a yoke end portion 21a, and a return yoke 22 forming the magnetic path together with the yoke 21. Note that the slider main body 20 is punched for the yoke 21 and the return yoke 22. A coil 23 consisting of a copper thin film is arranged around the return yoke 22 on the slider main body 20. An insulating film 24 is stacked on the coil 23 to cover the entire coil 23.

As shown in FIG. 3, the yoke 21 and the return yoke 22 are arranged on the insulating film 24 to radially cross the coil 23 from the central portion of the coil 23. The return yoke 22 is disposed at the central portion of the coil 23, while the yoke 21 is disposed from the central portion to peripheral portion of the coil 23.

The yoke 21 and the return yoke 22 are formed of iron-nickel-alloy thin films. The coil 23 is coupled to electrodes 25 formed at a peripheral portion, of the coil 23, opposite to the yoke 21. The electrodes 25 are connected to a copper wiring film 27 on the suspension spring 11 through a gold wire 26. An insulating film 28 is further formed on the yoke 21 and the electrodes 25 except for the connection portion to the gold wire 26. The yoke 21 is formed integrally with the return yoke 22 to serve as the path of the magnetic flux.

Contact pads 31 and 32 are arranged on a surface, of the slider main body 20, opposite to the coil 23 (surface facing the recording medium). The distal end portion of each of the contact pads 31 and 32 has a step portion structure 33 which functions as a bounce prevention structure using the meniscus force. The contact pads 31 and 32 and the step portion structures 33 constitute a slider floating/engaging mechanism. This slider floating/engaging mechanism controls to slide the magnetic head slider 12 having a predetermined loading force in contact (engaging) with the magnetic disk medium 1 and to slightly float it only in bouncing. The step portion structure 33 is formed by vertically injecting argon ions and performing milling. A step height h is freely set by controlling the milling time. Reference numerals 32a denote contact portions consisting of small-diameter portions formed at the distal end portions of the contact pads 31 and 32 through the step portion structures 33. The contact portions 32a slide in contact with the magnetic disk medium 1 in recording/reproduction.

Figure 5A:
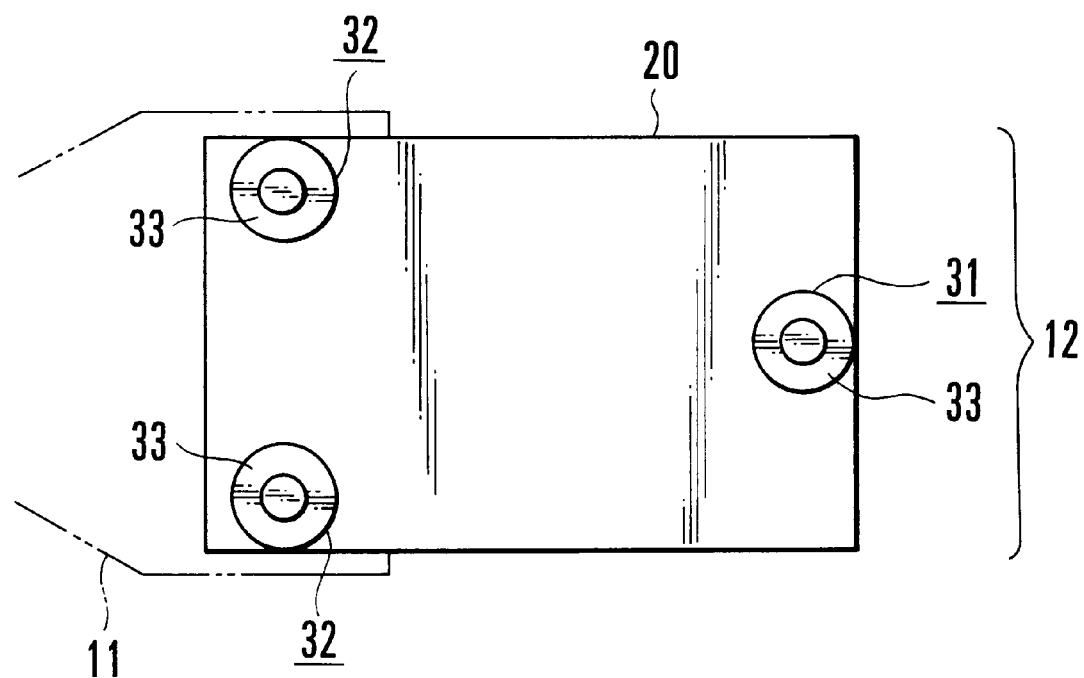
FIGS. 5A and 5B are a plan view and a front view, respectively, showing the magnetic head slider in FIG. 1.
Figure 5B:
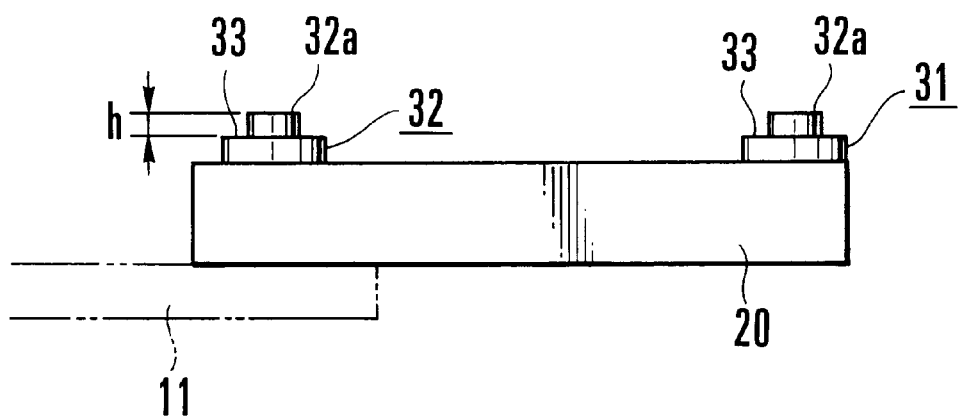

The contact pad 31 having, at its central axis portion, the end portion 21a of the yoke 21 constituting the magnetic head is arranged at the center of the distal end portion of the slider main body 20, as shown in FIGS. 5A and 5B. The yoke end portion 21a of the yoke 21 slides in contact with the surface of the magnetic disk medium 1, together with the contact portion 32a of the contact pad 31. The two contact pads 32 are arranged with a predetermined interval on the proximal end portion of the slider main body 20 on the suspension spring 11 side. The three contact pads 31 and 32 keep the whole balance of the magnetic head slider 12 with respect to the magnetic disk medium 1.

Figure 4:
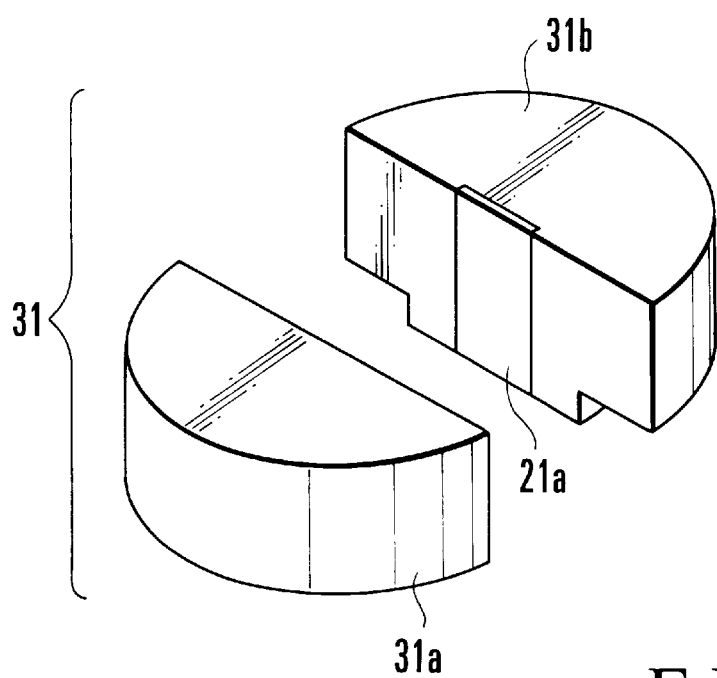
FIG. 4 is an exploded perspective view of a contact pad formed with a yoke end portion shown in FIG. 2.

Of these contact pads, the contact pad 31 is formed by bonding a contact pad piece 31a formed with diamond in a vertically cut state, and a contact pad piece 31b buried with the end portion 21a of the yoke 21 at the central axis portion, as shown in FIG. 4. This contact pad 31 is mounted on the slider main body 20.

The materials, formation methods, and the like of the substrate 2, the underlayer 3, the magnetic layer 4, the protective film 5, and the liquid lubricant 6 of the magnetic disk medium 1, the suspension spring 11, the spring support mechanism 13, and the slider main body 20, the yoke 21, the coil 23, the electrodes 25, the return yoke 22, the insulating film 24, the wire 26, the wiring film 27, and the contact pads 31 and 32 of the magnetic head slider 12 are not particularly limited. Known materials and formation methods can be used without any limitation.

The positions and numbers of the contact pads 31 and 32 are not limited to the above embodiment. The yoke end portion 21a constituting the magnetic head may be arranged on a contact pad other than the contact pad 31.

The operation of the magnetic disk apparatus having the above-described arrangement will be described below.

Figure 6:
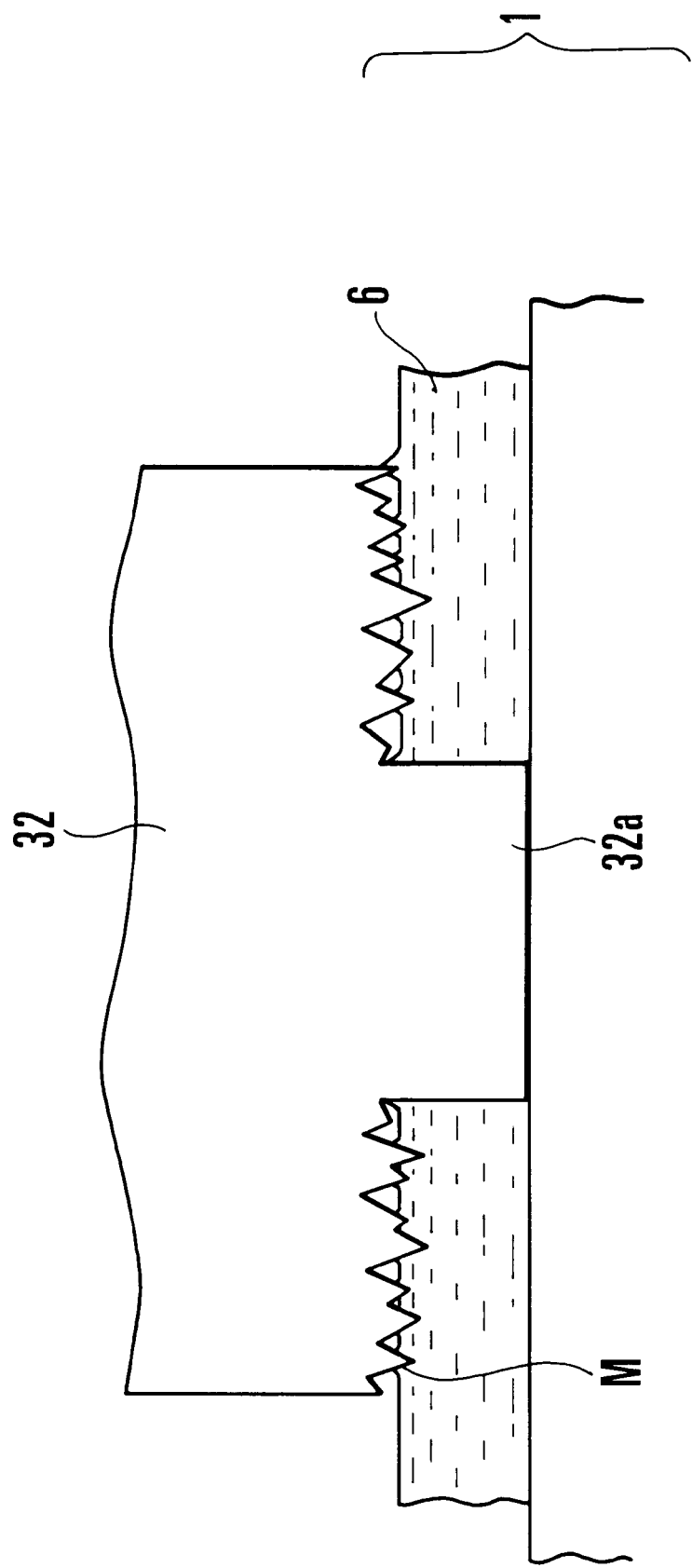
FIG. 6 illustrate the generation conditions for the meniscus by a slider floating/engaging mechanism having a bounce prevention structure shown in FIG. 5.

In the contact type magnetic disk apparatus in which the liquid lubricant 6 is applied on the magnetic disk medium 1, the meniscus of the liquid lubricant 6 is formed on the contact pads 31 and 32 of the magnetic head slider 12. Most liquid lubricants 6 used for the contact type magnetic disk apparatus have a thickness of 1 to 100 nm. As shown in FIG. 6, many meniscus portions M of the liquid lubricant 6 can be formed on the step surface by setting the step height h at the peripheral portion of the contact pad 31 or 32 to be almost equal to the film thickness of the liquid lubricant 6.

The meniscus portions M generate the attraction force between the liquid lubricant 6 and the contact pad. That is, the bounce of the magnetic head slider 12 from the magnetic disk medium 1 can be prevented by the meniscus force generated at the meniscus portions M. As shown in FIG. 7, when the magnetic head slider 12 rides over a small step or slightly vibrates in the bounce direction, a large meniscus force can be applied at a bounce portion by setting the surface roughness of the step surface to an average centerline roughness of 0.1 nm or more.

The meniscus force can also be generated by arranging a ring-like inclined surface structure around the surface of the contact pad 31 or 32 (to be described later), in addition to the above-mentioned step portion structure 33. Further, the same meniscus force can also be generated if a dedicated meniscus control pad is arranged at a portion other than the contact pads 31 and 32, the spacing between the meniscus control pad and the magnetic disk medium 1 is set equal to the spacing between the step portion 33 and the magnetic disk medium 1, and the surface roughness is similarly set.

Since the loading force of the magnetic head slider 12 can be decreased by preventing the magnetic head slider 12 from bouncing from the magnetic disk medium 1 in this manner, wear and damage of the magnetic disk medium 1 and the magnetic head slider 12 can be prevented. Therefore, a reliable contact type magnetic disk apparatus capable of high-density recording can be obtained.

Another example of the slider floating/engaging mechanism having the bounce prevention structure will be explained below with reference to FIGS. 8A and 8B to FIGS. 11A and 11B.

Example 1 of Slider Floating/Engaging Mechanism

Figure 8A:
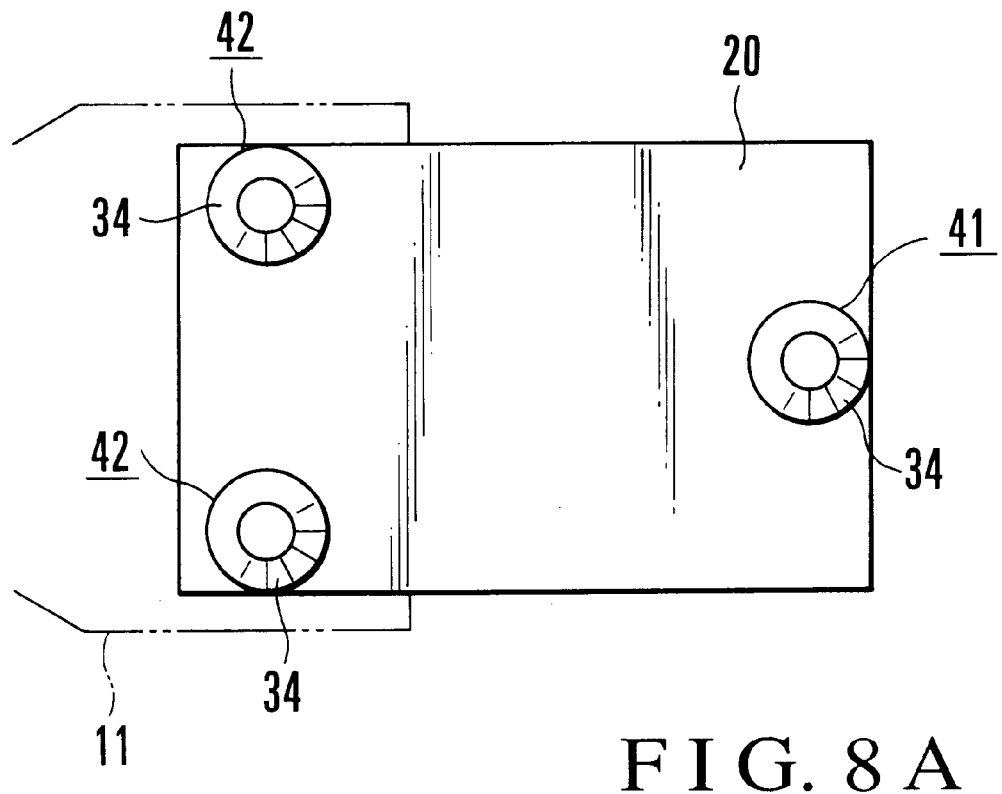
FIGS. 8A and 8B are a plan view and a front view, respectively, showing another example of the magnetic head slider in FIGS. 5A and 5B.
Figure 8B:
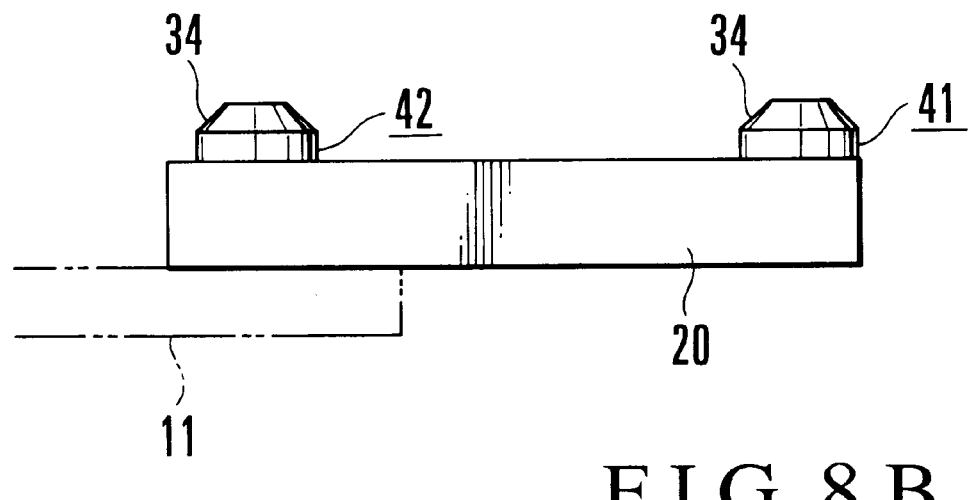

An example shown in FIGS. 8A and 8B is characterized in that inclined surface structures 34 are applied to one contact pad 41 arranged at the center of the distal end portion of the slider main body 20, and two contact pads 42 arranged at the proximal end portion on the suspension spring 11 side, and that the inclined surface structures 34 of the contact pads 41 and 42 constitute a slider floating/engaging mechanism having a bounce prevention structure. The inclined surface structure 34 of the contact pad 41 or 42 has a ring-like inclined surface at the peripheral portion of the distal end portion of the contact pad 41 or 42. That is, a section of the contact pad 41 or 42 along the press direction to the magnetic disk medium 1 has a trapezoidal shape.

The inclined surface structure 34 serving as the above-described slider floating/engaging mechanism (bounce prevention structure) is formed by obliquely injecting argon ions and performing milling. In this case, the angle of the inclined surface is controlled by the incident angle of the argon ion, and the surface roughnesses of the bottom and inclined surfaces of the step portion are controlled by an acceleration voltage in milling. In this case, the magnetic head is arranged at the contact pad 41. In this manner, the slider floating/engaging mechanism (bounce prevention structure) which functions almost similar to that of the contact pads 31 and 32 shown in FIGS. 5A and 5B can be attained.

Example 2 of Slider Floating/Engaging Mechanism

Figure 9A:
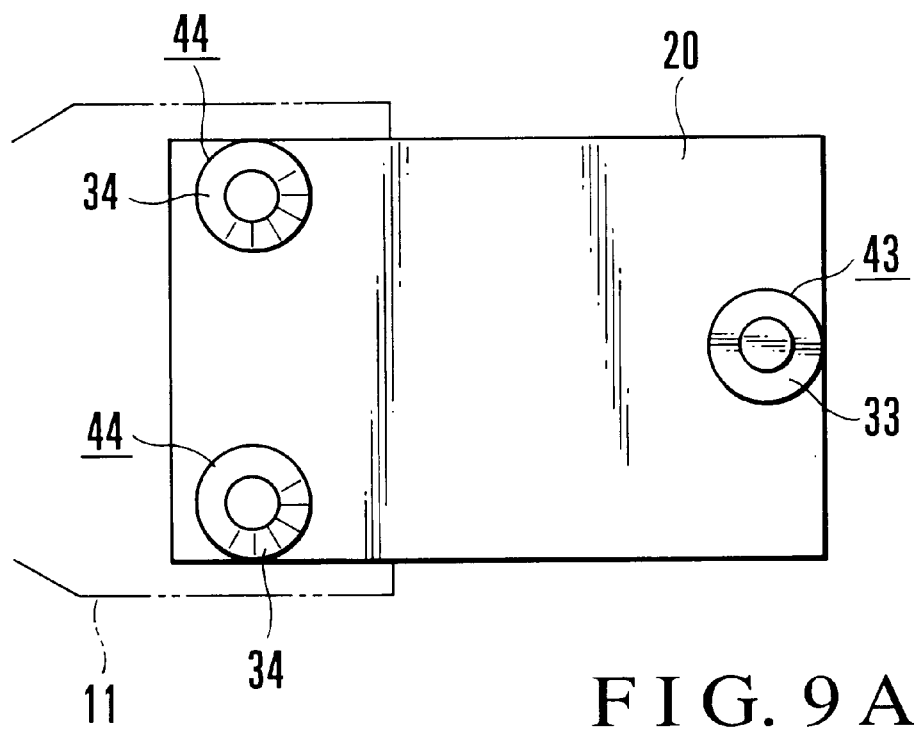
FIGS. 9A and 9B are a plan view and a front view, respectively, showing still another example of the magnetic head slider in FIGS. 5A and 5B.
Figure 9B:
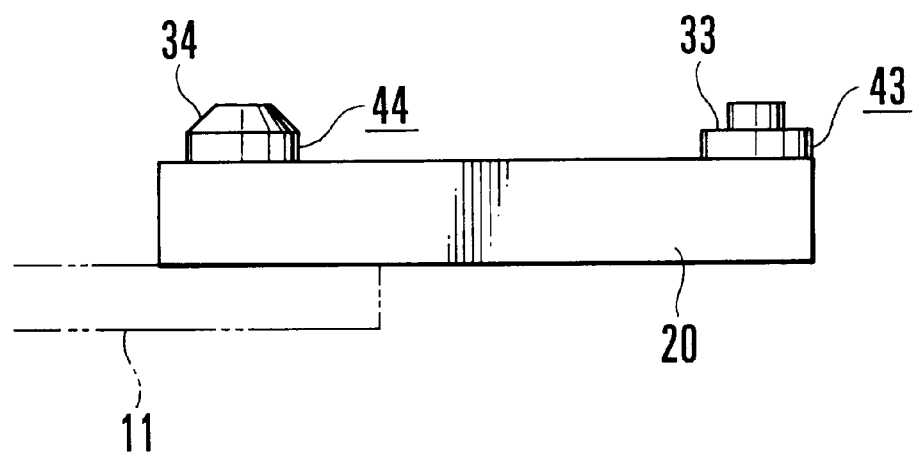
Figure 10:
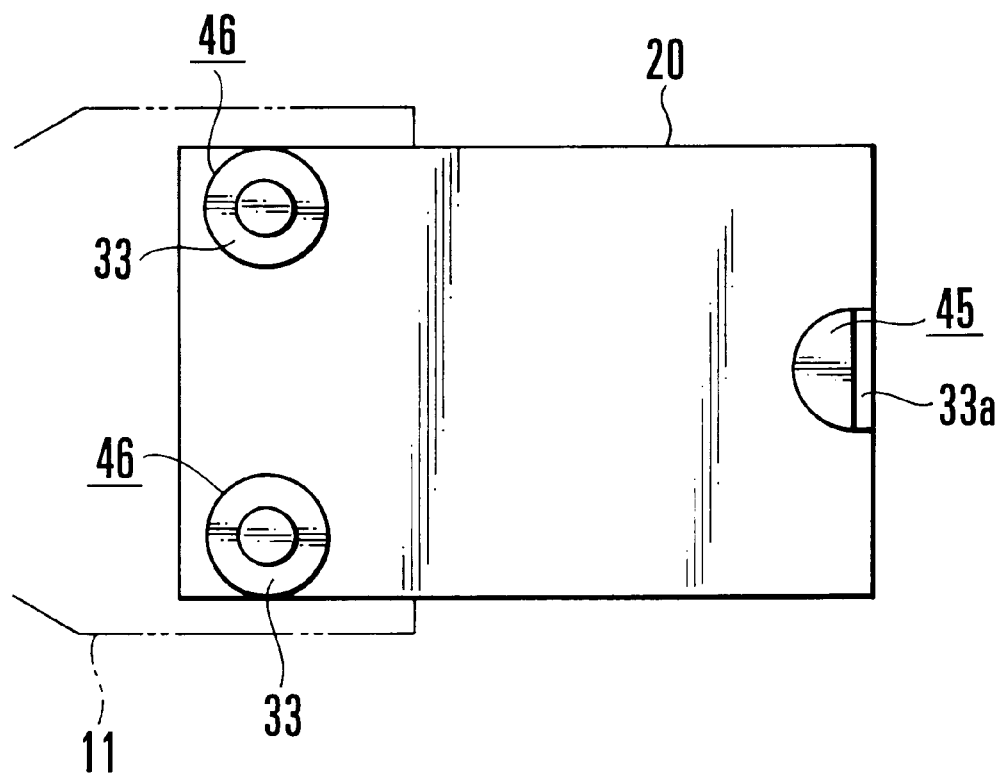
FIGS. 10A and 10B are a plan view and a front view, respectively, showing still another example of the magnetic head slider in FIGS. 5A and 5B.
Figure 10:
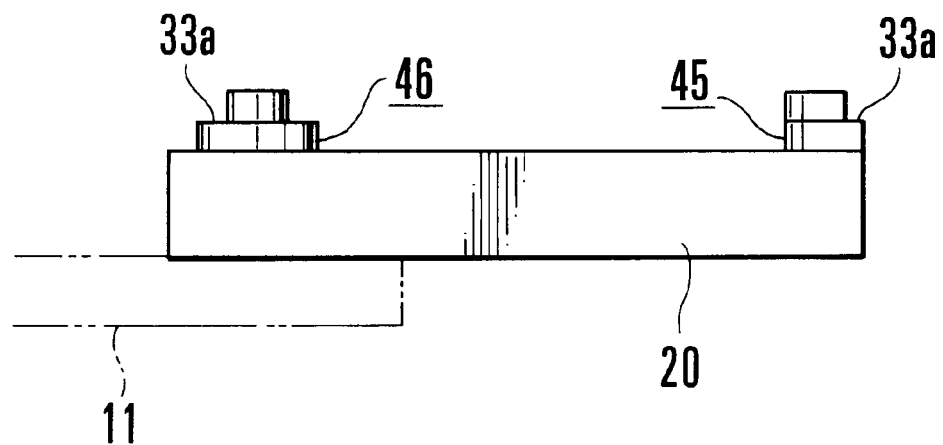
Figure 11:
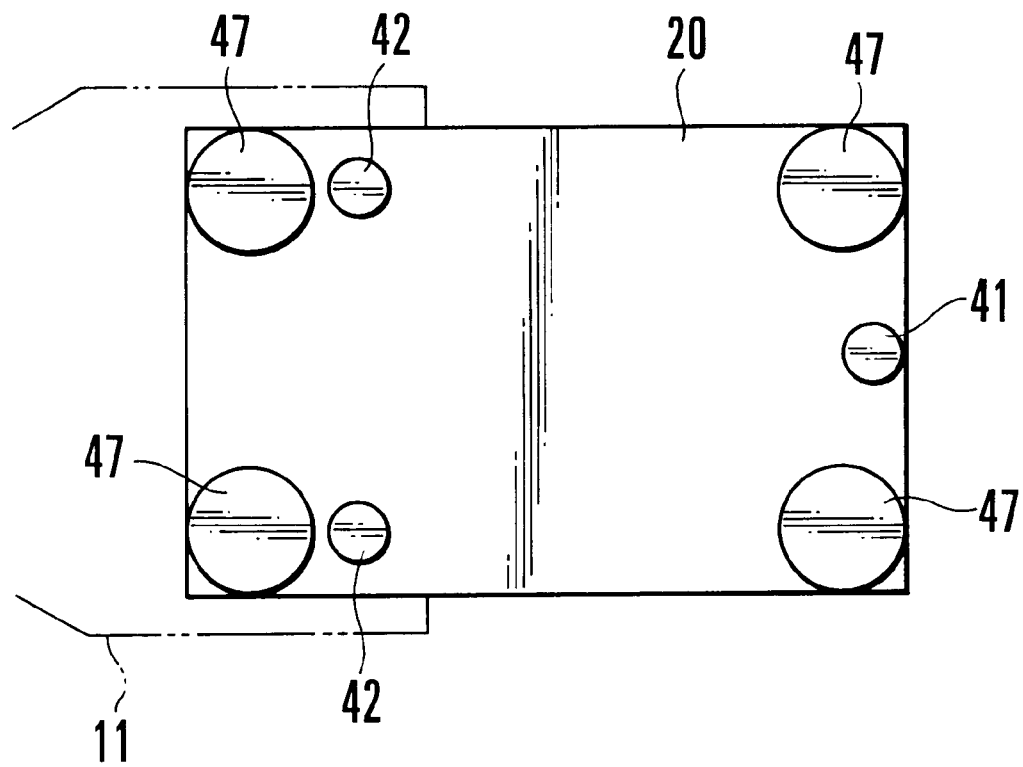
FIGS. 11A and 11B are a plan view and a front view, respectively, showing still another example of the magnetic head slider in FIGS. 5A and 5B.
Figure 11:
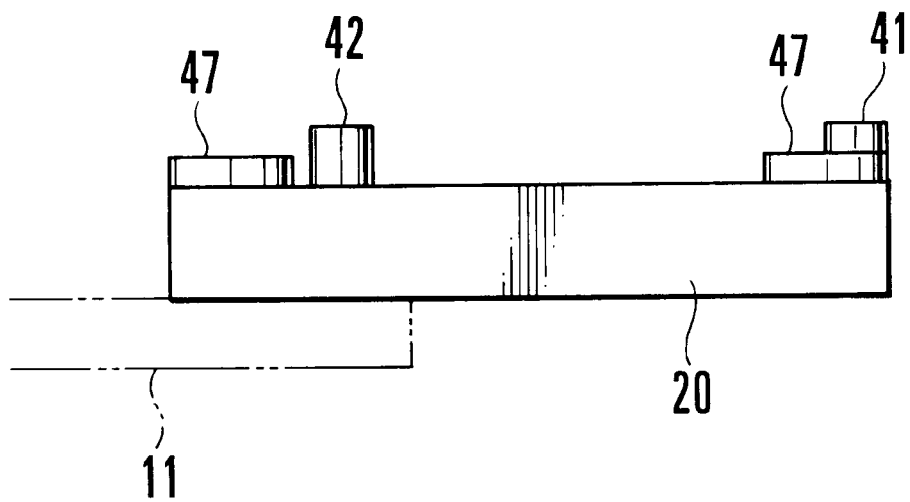

An example of the slider floating/engaging mechanism (bounce prevention structure) shown in FIGS. 9A and 9B is characterized in that a contact pad 43 arranged at the center of the distal end portion of the slider main body 20 has the step portion structure 33, and two contact pads 44 on the suspension spring 11 side have inclined surface structures 34 shown in FIGS. 8A and 8B. In this case, the magnetic head is arranged at the contact pad 43.

Even with this arrangement, the slider floating/engaging mechanism (bounce prevention structure) which functions almost similar to that of the contact pads 31 and 32 shown in FIGS. 5A and 5B can be attained.

Example 3 of Slider Floating/Engaging Mechanism

An example of the slider floating/engaging mechanism (bounce prevention structure) shown in FIGS. 10A and 10B is characterized in that a contact pad 45 arranged at the center of the distal end portion of the slider main body 20 has a step portion structure 33a, and two contact pads 46 on the suspension spring 11 side have the step portion structures 33 shown in FIGS. 5A and 5B. In this case, the magnetic head is arranged at the contact pad 45.

The stepped structure of the contact pad 45 is formed into a semi-columnar shape in which an entire arcuated portion is arranged inward. A step portion 45a of the arcuated contact pad 45 is arranged in the distal end direction of the slider main body.

Also with this arrangement, the slider floating/engaging mechanism (bounce prevention structure) which functions almost similar to stepped structures applied to the contact pads 31 and 32 shown in FIGS. 5A and 5B can be attained.

Example 4 of Slider Floating/Engaging Mechanism

The slider floating/engaging mechanism (bounce prevention structure) shown in FIGS. 11A and 11B is characterized in that four meniscus control pads 47 are arranged in addition to the contact pad 41 arranged at the center of the distal end portion of the slider main body 20, and the two contact pads 42 on the suspension spring 11 side.

These meniscus control pads 47 are arranged at the four corners of the slider main body 20. The height of each meniscus control pad 47 is set smaller than that of the contact pad 41 or 42.

The difference in height between the meniscus control pad 47 and the contact pad 41 or 42 is set within the range of 1 to 100 nm, and preferably the range of 5 to 10 nm in correspondence with the film thickness of the liquid lubricant 6 with which the surface of the magnetic disk medium 1 is coated. The roughness of the surface, of the meniscus control pad 47, facing the magnetic disk medium 1 is set to an average centerline roughness of 0.1 nm or more. In this case, the magnetic head is arranged at the contact pad 41.

Also with this arrangement, the slider floating/engaging mechanism (bounce prevention structure) which functions almost similar to that of the contact pads 31 and 32 shown in FIGS. 5A and 5B can be attained.

Experimental Example

To realize the above-described embodiment shown in FIG. 1 to 7, 48 samples (samples 1 to 48) of the magnetic head slider were fabricated. At the same time, Comparative Examples 1 and 2 respectively shown in FIGS. 12A and 12B and FIGS. 13A and 13B were fabricated. Their operation times and recording densities were measured. Comparative Example 1 is the prior art.

Respective samples are first explained, and the experimental results of conditions and the like for a reliable, durable magnetic head slider capable of high-density recording will be compared and examined on the basis of the following Table 1.

TABLE 1

| Sample No. | Step Height of Bounce Prevention Structure (nm) | Surface Roughness of Bounce Prevention Structure (nm) | Inclination Angle of Bounce Prevention Structure (°) | Spacing Between Meniscus Control Pad and Medium (nm) | Operation Time Until Error Rate Is Doubled (Time) | Recording Density (Gbit/in$^2$) |
|---|---|---|---|---|---|---|
| 1 | 1 | 0.5 | — | — | 3705 | 12.3 |
| 2 | 2 | 0.5 | — | — | 3770 | 11.9 |
| 3 | 3 | 0.5 | — | — | 3862 | 13.5 |
| 4 | 5 | 0.5 | — | — | 5932 | 35.2 |
| 5 | 10 | 0.5 | — | — | 6258 | 36.3 |
| 6 | 20 | 0.5 | — | — | 4330 | 19.5 |
| 7 | 30 | 0.5 | — | — | 4851 | 17.6 |
| 8 | 50 | 0.5 | — | — | 3967 | 15.1 |
| 9 | 100 | 0.5 | — | — | 3714 | 10.9 |
| 10 | 200 | 0.5 | — | — | 1013 | 3.2 |
| 11 | 500 | 0.5 | — | — | 986 | 1.7 |
| 12 | 5 | 0.01 | — | — | 1562 | 1.8 |
| 13 | 5 | 0.05 | — | — | 1719 | 2.5 |
| 14 | 5 | 0.1 | — | — | 4325 | 13.5 |
| 15 | 5 | 1.0 | — | — | 4449 | 19.2 |
| 16 | 5 | 5.0 | — | — | 5138 | 17.5 |
| 17 | 5 | 10.0 | — | — | 5011 | 21.4 |
| 18 | — | 0.5 | 1 | — | 3215 | 17.6 |
| 19 | — | 0.5 | 5 | — | 3398 | 15.2 |
| 20 | — | 0.5 | 10 | — | 3443 | 14.8 |
| 21 | — | 0.5 | 20 | — | 3806 | 17.9 |
| 22 | — | 0.5 | 30 | — | 3024 | 11.3 |
| 23 | — | 0.5 | 40 | — | 1765 | 7.2 |
| 24 | — | 0.5 | 50 | — | 1094 | 3.3 |
| 25 | — | 0.01 | 10 | — | 925 | 1.8 |
| 26 | — | 0.05 | 10 | — | 1010 | 3.2 |
| 27 | — | 0.1 | 10 | — | 3256 | 11.6 |
| 28 | — | 1.0 | 10 | — | 3365 | 13.2 |
| 29 | — | 5.0 | 10 | — | 3826 | 15.9 |
| 30 | — | 10.0 | 10 | — | 4432 | 13.3 |
| 31 | — | 0.5 | — | 1 | 3663 | 10.8 |
| 32 | — | 0.5 | — | 2 | 3829 | 15.4 |
| 33 | — | 0.5 | — | 3 | 4132 | 17.6 |
| 34 | — | 0.5 | — | 5 | 6635 | 53.2 |
| 35 | — | 0.5 | — | 10 | 7212 | 49.8 |
| 36 | — | 0.5 | — | 20 | 3256 | 11.1 |
| 37 | — | 0.5 | — | 30 | 3819 | 18.6 |
| 38 | — | 0.5 | — | 50 | 2957 | 13.7 |
| 39 | — | 0.5 | — | 100 | 3139 | 14.2 |
| 40 | — | 0.5 | — | 200 | 925 | 3.2 |
| 41 | — | 0.5 | — | 500 | 513 | 0.8 |
| 42 | — | 0.01 | — | 5 | 1215 | 1.2 |
| 43 | — | 0.05 | — | 5 | 1101 | 1.6 |
| 44 | — | 0.1 | — | 5 | 3252 | 21.5 |
| 45 | — | 1.0 | — | 5 | 4232 | 18.0 |
| 46 | — | 5.0 | — | 5 | 3939 | 17.6 |
| 47 | — | 10.0 | — | 5 | 4017 | 20.0 |
| 48 | 10 | 0.5 | — | — | 3257 | 14.5 |
| Comparative Example 1 | — | — | — | — | 192 | 0.7 |
| Comparative Example 2 | — | — | — | — | 185 | 0.8 |

Sample 1

As the magnetic head slider, a magnetic head slider shown in FIGS. 5A and 5B was used. In three contact pads 31 and 32 each having a stepped structure, the diameter of each contact portion 32a was set at 50 μm, the diameter of each step portion 33 was set at 100 μm, the average centerline roughness of the surface of the step portion structure 33 was set at 0.5 nm, and the step height h was set at 1 nm.

Samples 2 to 11

The step height h was changed within the range of 1 to 500 nm, as shown in Table 1. The conditions except for the step height h were the same as those of sample 1.

Sample 12

The average centerline roughness of the surface of the step portion 33 was set at 0.01 nm, and the remaining conditions were the same as those of sample 1.

Samples 13 to 17

The average centerline roughness of the surface of the step portion 33 was changed within the range of 0.05 to 10.0 nm. The remaining conditions were the same as those of sample 12.

Sample 18

As the magnetic head slider, a magnetic head slider having contact pads 41 and 42 with inclined surface structures 34 shown in FIGS. 8A and 8B were used. The diameters of the contact portions of the contact pads 41 and 42 were set at 50 μm, and the diameter of the bottom surface of each inclined portion was set at 100 μm. The angle of the section at the gap formed when the contact pad 41 or 42 came into contact with the magnetic disk medium 1 was set at 1°.

Samples 19 to 24

The angle of the inclined surface was changed within the range of 5° to 50°. The remaining conditions were the same as those of sample 18.

Sample 25

The angle of the section at the gap formed when the contact pad 41 or 42 came into contact with the magnetic disk medium 1 was set at 10°. The average centerline roughness of the inclined surface was set at 0.01 nm. The remaining conditions were the same as those of sample 18.

Samples 26 to 30

The average centerline roughness of the inclined surface was changed within the range of 0.05 to 10.0 nm. The remaining conditions were the same as those of sample 25.

Sample 31

As the magnetic head slider, a magnetic head slider shown in FIGS. 11A and 11B was used. That is, four meniscus control pads 47, one contact pad 41 formed with a magnetic head, and two contact pads 42 formed with no magnetic head were arranged. The diameters of the contact pads 41 and 42 were set at 50 μm, and the diameter of each meniscus control pad 47 was set at 100 μm. The average centerline roughness of the surface of the meniscus control pad 47 was set at 0.5 nm. The spacing between the meniscus control pad 47 and the magnetic disk medium 1 was set at 1 nm.

Samples 32 to 41

The spacing between the meniscus control pad 47 and the magnetic disk medium 1 was changed within the range of 2 to 500 nm. The remaining conditions were the same as those of sample 31.

Sample 42

The spacing between the meniscus control pad 47 and the magnetic disk medium 1 was set at 5 nm, and the average centerline roughness of the surface of the meniscus control pad 47 was set at 0.01 nm. The remaining conditions were the same as those of sample 31.

Samples 43 to 47

The average centerline roughness of the surface of the meniscus control pad 47 was changed within the range of 0.05 to 10.0 nm. The remaining conditions were the same as those of sample 42.

Sample 48

Three contact pads 45 and 46 having step portion structures 33a and 33 were arranged, as shown in FIGS. 10A and 10B. The diameters of the contact portions of the two contact pads 46 formed with no magnetic head were set at 50 μm, and the diameter of each step portion was set at 100 μm. The diameter of the semi-columnar contact pad 45 formed with the magnetic head was set at 50 μm, the width of the step portion was set at 100 μm, and the length thereof was set at 20 μm. The heights of all the steps were set at 1 nm, and the average centerline roughnesses of the surfaces of all the step portions were set at 0.5 nm.

Comparative Example 1

Figure 12A:
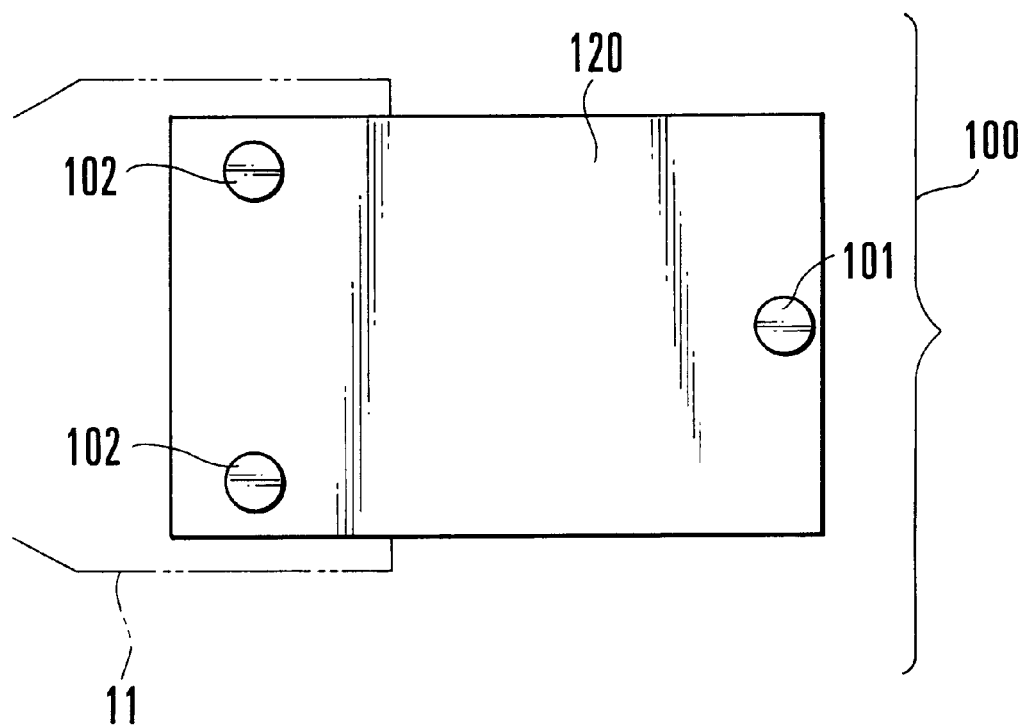
FIGS. 12A and 12B are a plan view and a front view, respectively, showing a conventional magnetic head slider used for a comparative experiment of the magnetic head slider.
Figure 12B:
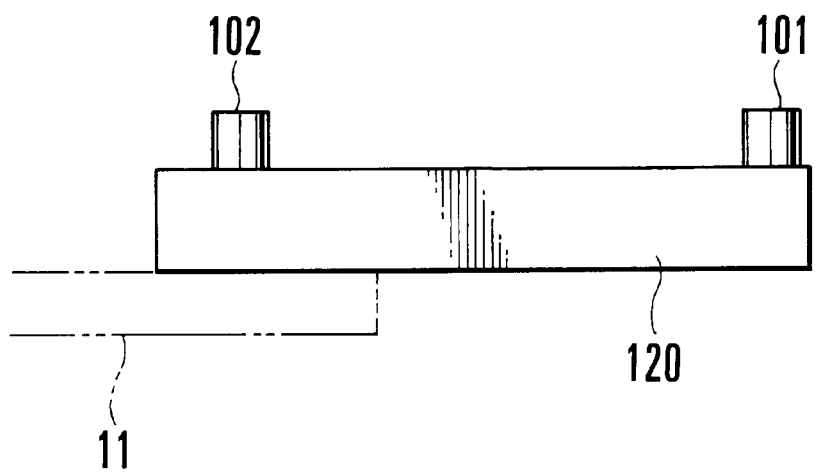

Three contact pads 101 and 102 having no slider floating/ engaging mechanism were arranged on a slider main body 120, as shown in FIGS. 12A and 12B. The diameters of the contact pads 101 and 102 were set at 50 μm.

Comparative Example 2

Figure 13:
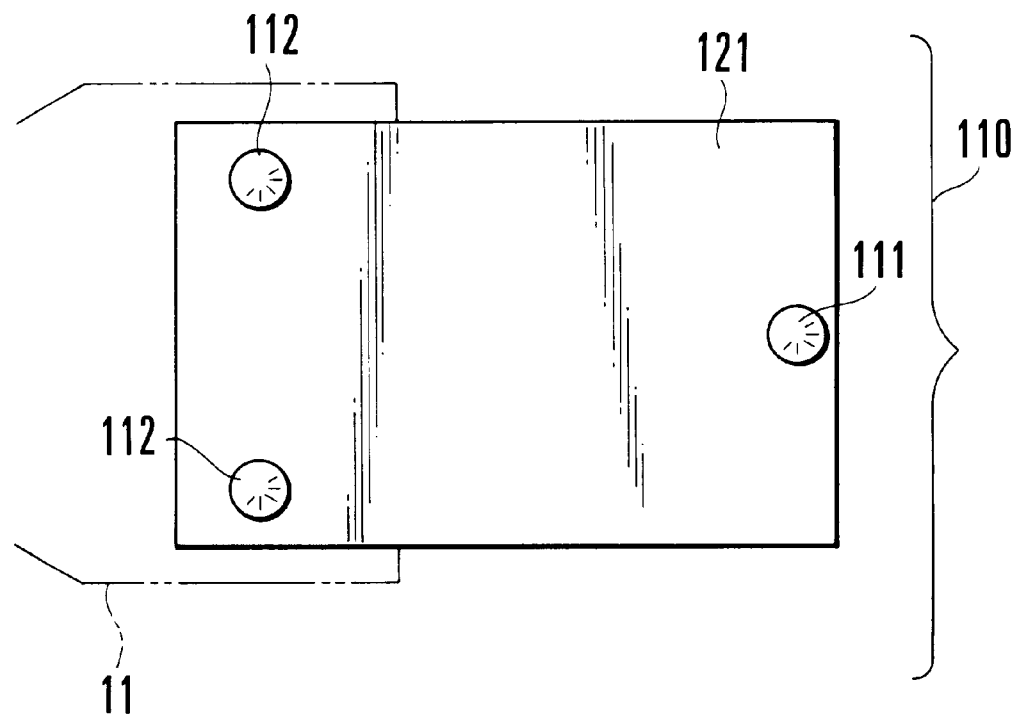
FIGS. 13A and 13B are a plan view and a front view, respectively, showing a magnetic head slider used as a comparative example for a comparative experiment of the magnetic head slider.
Figure 13:
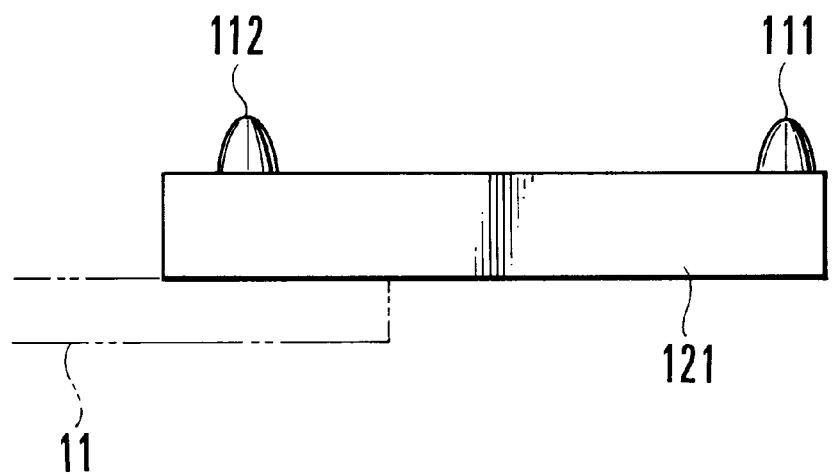

Three spherical contact pads 111 and 112 were arranged on a slider main body 121, as shown in FIGS. 13A and 13B. The diameters of the contact pads 111 and 112 were set at 50 μm. The radii of the curvature of the spherical contact pads 111 and 112 were set at 100 μm.

Comparison and Examination

A contact type magnetic disk apparatus using each of the above samples was subjected to a recording/reproduction experiment by rotating a magnetic disk medium at 5,400 rpm and sliding it within a radius of 23 mm. To evaluate the reliability of the contact type magnetic disk apparatus, the operation time until the error rate of a recording/ reproduction signal became twice the initial value, and the maximum recording density capable of recording and reproduction were calculated. The results are shown in Table 1.

Samples 1 to 9 and Comparative Examples 1 and 2 were compared and examined on the basis of Table 1. When the slider floating/engaging mechanism having the bounce prevention structure was arranged, the operation time until the error rate became twice the initial value increased at least 19 times or more. In addition, the recording density capable of recording and reproduction increased at least 13 times or more.

That is, if a step having a depth of 1 to 100 nm is formed as the slider floating/engaging mechanism at the peripheral portion of the contact pad, a reliable contact type magnetic disk apparatus having a high recording density can be provided.

When the step height was 5 to 10 nm, the operation time until the error rate became twice the initial value, and the recording density capable of recording and reproduction greatly increased. That is, if the step height is set to 5 to 10 nm, the performance can be further improved.

Samples 14 to 17 and Comparative Examples 1 and 2 were compared and examined on the basis of Table 1. When the average centerline roughness of the surface of the slider floating/engaging mechanism was set to 0.1 nm or more, the operation time until the error rate became twice the initial value increased 22 times or more. In addition, the recording density capable of recording and reproduction increased at least 16 times or more.

That is, if the surface roughness of the slider floating/ engaging mechanism is set to 0.1 nm or more, a reliable contact type magnetic disk apparatus having a high recording density can be provided.

Samples 18 to 22 and Comparative Examples 1 and 2 were compared and examined on the basis of Table 1. When the contact pad having flat bottom and upper surfaces (surfaces of step portion structure), serving as the slider floating/engaging mechanism having the bounce prevention structure, was inclined at an angle within the range of 1° to 30° at the gap with respect to the magnetic disk medium, the operation time until the error rate became twice the initial value increased at least 15 times or more. In addition, the recording density capable of recording and reproduction increased at least 14 times or more.

That is, if the contact pad having flat bottom and upper surfaces is inclined, a reliable contact type magnetic disk apparatus having a high recording density can be provided.

Samples 27 to 30 and Comparative Examples 1 and 2 were compared and examined on the basis of Table 1. When the average centerline roughness of the surface of the slider floating/engaging mechanism was set to 0.1 nm or more, the operation time until the error rate became twice the initial value increased 16 times or more. In addition, the recording density capable of recording and reproduction increased at least 14 times or more.

That is, if the surface roughness of the slider floating/engaging mechanism is set to 0.1 nm or more, a reliable contact type magnetic disk apparatus having a high recording density can be provided.

Samples 27 to 39 and Comparative Examples 1 and 2 were compared and examined on the basis of Table 1. When the meniscus control pads were individually arranged as the slider floating/engaging mechanism having the bounce prevention structure, the operation time until the error rate became twice the initial value increased at least 16 times or more. In addition, the recording density capable of recording and reproduction increased at least 13 times or more.

That is, if the spacing between the meniscus control pad and the magnetic disk medium is set to 1 to 100 nm, a reliable contact type magnetic disk apparatus having a high recording density can be provided.

When the spacing between the meniscus control pad and the magnetic disk medium was 5 to 10 nm, the operation time until the error rate became twice the initial value, and the recording density capable of recording and reproduction greatly increased. That is, if the spacing between the meniscus control pad and the magnetic disk medium is set to 5 to 10 nm, the performance can be further improved.

Samples 44 to 47 and Comparative Examples 1 and 2 were compared and examined on the basis of Table 1. When the surface roughness of the meniscus control pad was an average centerline roughness of 0.1 nm or more, the operation time until the error rate became twice the initial value increased 16 times or more. In addition, the recording density capable of recording and reproduction increased at least 22 times or more.

That is, if the surface roughness of the meniscus control pad is set to 0.1 nm or more, a reliable contact type magnetic disk apparatus having a high recording density can be provided.

In this manner, it was experimentally confirmed that the durability and recording/reproduction properties of the contact magnetic disk apparatus according to this embodiment were at least 10 times those of a conventional contact type magnetic disk apparatus, and that high reliability and a high recording density could be ensured.

As has been described above, according to the present invention, even in the contact type magnetic disk apparatus, the bounce of the magnetic head slider can be effectively suppressed by controlling the meniscus force generated between the magnetic disk medium and the magnetic head slider. Therefore, not only the high recording density can be ensured, but also wear and damage of the magnetic head slider and the magnetic disk medium can be prevented. As a result, there can be provided an excellent contact type magnetic disk apparatus, which has not conventionally been attained, in which the durability can be increased while ensuring high reliability in recording/reproducing information.

What is claimed is:

1. A contact type magnetic disk apparatus comprising:
   a magnetic disk medium having a liquid lubricant applied to a predetermined film thickness on a surface;
   a magnetic head slider having a magnetic head which records/reproduces information in/from said magnetic disk medium, while sliding in contact with said magnetic disk medium;
   a plurality of contact pads arranged on said magnetic head slider with their distal ends facing, said magnetic disk medium, for coming into contact with a surface of said magnetic disk medium, all of said contact pads being cylindrically shaped; and
   a bounce prevention structure arranged on said head slider including said cylindrically shaped contact pads to prevent bounce of said magnetic head slider from said magnetic disk medium, said bounce prevention structure comprising a ring-like step portion formed on said distal ends of said cylindrically shaped contact pads and extending normally therefrom to a predetermined spacing with respect to said surface of said magnetic disk medium when said cylindrically shaped contact pads come into contact with said magnetic disk medium, whereby bounce is prevented by a meniscus force of the liquid lubricant attaching to the ring-like portion when the head slider is in motion.

2. An apparatus according to claim 1, wherein said ring-like portions comprise small diameter portions formed at a periphery of a distal end portion of each of said cylindrically shaped contact pads.

3. An apparatus according to claim 2, wherein a step of said step portion has a height almost equal to as the film thickness of the liquid lubricant.

4. An apparatus according to claim 3, wherein the step of said step portion has a height of 1 to 100 nm.

5. An apparatus according to claim 2, wherein a step surface of said step portion has an average centerline roughness of not less than 0.1 nm as a surface roughness.

6. An apparatus according to claim 1, wherein some of said ring-like portions include an inclined surface formed at a periphery of a distal end portion of each of said cylindrically shaped contact pads.

7. An apparatus according to claim 6, wherein said inclined surface has an inclination angle of 1° to 30°.

8. An apparatus according to claim 6, wherein said inclined surface has an average centerline roughness of not less than 0.1 nm as a surface roughness.

9. An apparatus according to claim 1, wherein said ring-like portions comprise a plurality of meniscus control pads arranged on said magnetic head slider so as to face said magnetic disk medium, and
   each of said meniscus control pads has a height smaller than that of each of said cylindrically shaped contact pads.

10. An apparatus according to claim 9, wherein a difference in height between said meniscus control pad and said cylindrically shaped contact pad is set to be almost equal to the film thickness of the liquid lubricant.

11. An apparatus according to claim 10, wherein the difference in height between said meniscus control pad and said cylindrically shaped contact pad is set to 1 to 100 nm.

12. An apparatus according to claim 9, wherein a surface of each of said meniscus control pads facing said magnetic disk medium has a surface roughness of not less than 0.1 nm as an average centerline roughness.

13. An apparatus according to claim 1, wherein some of said cylindrically shaped contact pads include inclined surfaces formed at peripheries of distal end portions thereof.

14. An apparatus according to claim 1, wherein said cylindrically shaped contact pads and said bounce prevention structure constitute a slider floating/engaging mechanism for sliding said magnetic head slider in contact with said magnetic disk medium, and slightly floating said magnetic head slider only in bouncing.

15. An apparatus according to claim 13, wherein said inclined surfaces have an inclination angle of 1° to 30° and an average centerline roughness of not less than 0.1 nm as a surface roughness.

16. An apparatus according to claim 1 wherein said magnetic head slider comprises a distal end and a proximal end, including a pair of said cylindrically shaped contact pads arranged adjacent the proximal end of said magnetic head slider, and a single cylindrically shaped contact pad arranged adjacent the center of the proximal end of said magnetic head slider.

17. A contact type magnetic disk apparatus comprising:
 a magnetic disk medium having a liquid lubricant applied to a predetermined film thickness on a surface;
 a magnetic head slider having a magnetic head which records/reproduces information in/from said magnetic disk medium, while sliding in contact with said magnetic disk medium;
 a plurality of contact pads arranged on said magnetic head slider with their distal ends facing said magnetic disk medium for coming into contact with a surface of said magnetic disk medium, all of said contact pads being cylindrically shaped; and
 a bounce prevention structure arranged on said head slider including said contact pads to prevent bounce of said magnetic head slider from said magnetic disk medium by using a meniscus force of the liquid lubricants said bounce prevention structure having a predetermined spacing with respect to said surface of said magnetic disk medium when said cylindrically shaped contact pads come into contact with said magnetic disk medium, said bounce prevention structure a ring-like step portion extending normally from said distal ends of said cylindrically shaped contact pads and having a height almost equal to as the film thickness of the liquid lubricant formed at a periphery of a distal end portion of each of said cylindrically shaped contact pads, wherein a step surface of said step portion has an average centerline roughness of not less than 0.1 nm as a surface roughness.

18. An apparatus according to claim 17, wherein the step of said step portion has a height of 1 to 100 nm.

19. An apparatus according to claim 17, wherein said magnetic head slider comprises a distal end and a proximal end, including a pair of said cylindrically shaped contact pads arranged adjacent the proximal end of said magnetic head slider, and a single cylindrically shaped contact pad arranged adjacent the center of the proximal end of said magnetic head slider.

* * * * *